Feb. 4, 1964     I. E. BOCK     3,120,126

THERMOCOUPLE WITH FOUR DISSIMILAR WIRES

Filed April 2, 1962

INVENTOR
Immus Emich Bock
By James R. Hughes
AGENT 3,120,126
THERMOCOUPLE WITH FOUR DISSIMILAR WIRES
Immo E. Bock, Pretoria, Republic of South Africa, assignor to Atomic Energy of Canada Limited, a corporation
Filed Apr. 2, 1962, Ser. No. 184,431
2 Claims. (Cl. 73—359)

This invention relates to a temperature measuring device using a thermocouple with at least four dissimilar wires.

The use of thermocouples in temperature measuring apparatus is well known. The standard type of thermocouple consists of two wires made of dissimilar metals connected together at a common point to form what is known as a hot junction. This hot junction is placed in the atmosphere the temperature of which is to be measured. The other ends of the two wires are connected together at a point remote from the hot junction forming what is known as a cold junction. The cold junction is normally held at a fixed temperature by means of an ice-bath, etc. If there is a temperature difference between the hot junction and the cold junction, an electric current will flow in the closed circuit due to the Seebeck effect. The strength of this current will vary directly with the temperature difference and if a current measuring device is interposed in the circuit, a temperature measuring apparatus is obtained.

In certain applications such as the measurement of temperature and temperature differences in coolant and fuel sheaths of nuclear reactors, it is necessary and desirable to have very reliable thermocouples. Thermocouples are prone to undergo gradual drifts and sometimes fail completely due to imperfections in the hot junction. Studies have indicated that there is no systematic magnitude or direction of thermocouple drifts. Duplications of thermocouples increases reliability but when disagreement is found between the two readings there is no way of determining which thermocouple is operating accurately and which has been affected by drift. If three thermocouples are used then the drift of any one will be immediately obvious since it indicates a temperature different from that of the other two.

Triplication of thermocouples entails that for every temperature measurement required, it is necessary to bring three thermocouple pairs into the location of interest. As each thermocouple pair is normally sheathed in stainless steel, triplication tends to limit the number of temperature measurements that can be taken due to the small amount of space available in most locations for thermocouple probes.

The object of the present invention is to provide a temperature measuring device that will give several readings of the temperature of a point in a location the temperature of which is to be measured, so that these readings can be compared to ascertain those that can be relied upon and those that should be rejected as being unreliable due to drift and other imperfections that might take place in the thermocouples.

Another object of the invention is to provide a temperature measuring device that will give six or more temperature readings for a single location but requires only a single thermocouple probe and a minimum number of leads from the thermocouple probe to the recording apparatus.

Applicant has found that these objects can be realized by providing a temperature measuring system comprising; a thermocouple having at least four dissimilar wires connected at a common point to form a hot junction with the other ends of these wires connected to copper lead wires at points remote from the hot junction forming cold junctions; a multiple recording device; and means to connect the recording device in sequence to the combinations of the lead wires taken two at a time.

In drawings which illustrate embodiment of the invention,

Figure 1:
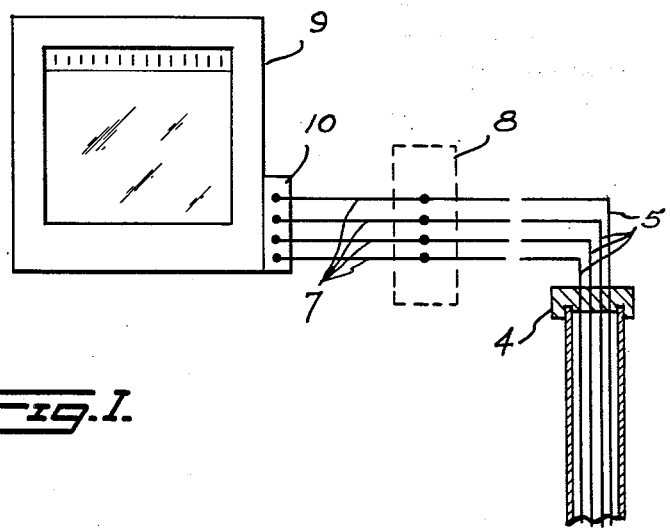
FIGURE 1 is a schematic circuit diagram of a preferred embodiment of this invention showing the thermocouple probe in section.

Referring to FIGURE 1, a thermocouple probe is shown generally at 1, having a sheath 2, insulation 3, and a moisture seal 4. The thermocouple is made up of four dissimilar wires 5 connected at a common point forming a hot junction 6. The other ends of each of these dissimilar wires are brought out to a point remote from the hot junction and connected to copper lead wires 7 to form cold junction 8. The copper lead wires are connected to a multi-point millivolt recorder 9 which incorporates an automatically driven commutator device (not shown) to connect the recorder to the lead wire terminals 10 two at a time in sequence giving six different combinations.

Figure 2:
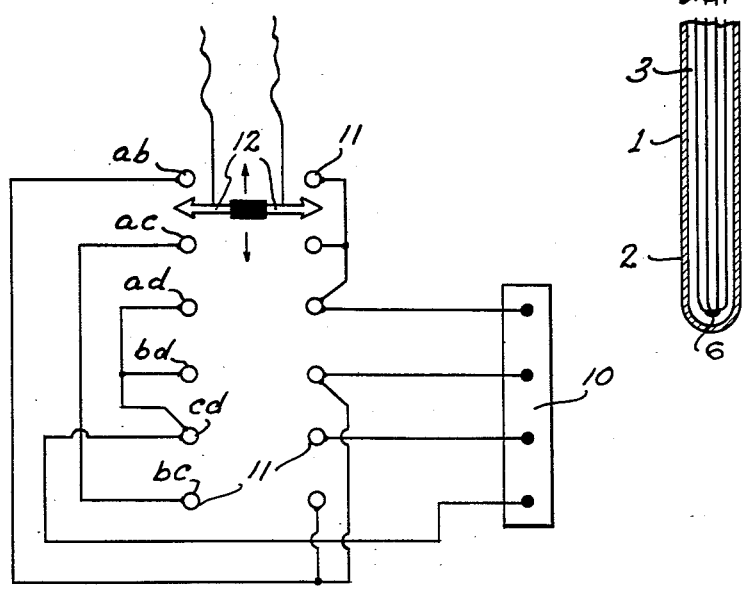
FIGURE 2 is a method of wiring a commutator device to connect the multi-point recording device to the thermocouple leads.

FIGURE 2 shows in schematic form a suitable method of wiring the commutator device. Terminals 10 are connected in combination to pairs of commutator terminals 11 as shown. Wiper arm 12 which in actual practice would be a rotary device electrically connects the pairs of terminals in sequence to the recorder. The wiper arm is suitably driven by a motor which operates in synchronism with the recorder mechanism. Commutator devices are standard parts of most commercial multi-point millivolt recorders and their operation will not be described further here.

Referring again to the thermocouple the sheath 2 would preferably be made of stainless steel. Other sheath materials could be used e.g., tantalum if very high temperatures were expected. Insulation 3 could be any suitable material. Oxides of aluminum, magnesium, beryllium, or zirconium have been found suitable for applications in nuclear reactors. The dissimilar thermocouple wires could be made of Chromel, Alumel, iron, constantan, copper, tungsten-rhenium, platinum, or molybdenum. For temperature measurements up to 760° C., the first four materials would probably be most suitable. For higher temperatures various tungsten-rhenium alloys would be used. The cold junctions 8 can be of standard design. The thermocouple wires are each connected to copper lead wires, with the junctions so formed placed in small-diameter test tubes containing a few drops of mercury. The test tubes are immersed in a water and ice mixture bath contained in a thermos flask. For thermocouple reliability it is desirable to have all four junctions in the same water and ice bath.

In the above description a thermocouple has been described using four dissimilar wires giving six temperature readings. It might be assumed that three dissimilar wires could be used to eliminate ambiguity. If three wires are used three readings of temperature would be obtained. A drift in the properties of one of the thermocouple wires will affect at least two of these readings and there is no way of determining which readings could be relied upon. Where four wires are used, a drift in one of the wires would affect no more than three of the six readings but these variations in readings would not all be of the same magnitude and direction. The other three readings being unaffected, would all be of equal value and could be relied upon. More than four dissimilar wires could be used giving ten readings for five wires, fifteen readings for six wires, etc. Practical considerations would limit the number of wires used and in any case four wires provides a reliable temperature measurement for one location and there would therefore be little need to use more than this number.

I claim:

1. A temperature measuring apparatus comprising; a thermocouple having $n$, where $n$ is an integer greater than 3, dissimilar wires connected at a common point to form a hot junction, each of said dissimilar wires connected at their other ends to copper lead wires forming cold junctions; temperature controlling means to hold the said cold junctions at an equal and constant temperature level; a recording device capable of multiple records; and switch means to connect the recording device to the copper lead wires two at a time in sequence to give $$\frac{n(n-1)}{2}$$

recordings of temperature.

2. A temperature measuring apparatus as defined in claim 1 where $n$ is equal to four.

References Cited in the file of this patent

Applied Cryogenic Engineering—Published by John Wiley & Sons, Inc.; (New York) 1962, pp. 84–01 relied on. Copy in Sci. Libr. Call # Tp 482 V 3.